United States Patent
Pickel

[11] 3,731,501
[45] May 8, 1973

[54] SYNCHRONOUS UNIVERSAL JOINT

[76] Inventor: Hajo Pickel, Friedrichstrasse 15, Hachenburg, Germany

[22] Filed: Mar. 4, 1971

[21] Appl. No.: 120,973

[30] Foreign Application Priority Data

Apr. 1, 1970 Germany.....................P 20 15 459.0

[52] U.S. Cl. .................................................64/17 R
[51] Int. Cl..............................................F16d 3/26
[58] Field of Search....................................64/17, 21

[56] References Cited

UNITED STATES PATENTS

| | | | |
|---|---|---|---|
| 1,143,596 | 6/1915 | Bockhoff | 64/17 R |
| 3,166,918 | 10/1965 | Bouchard | 64/17 R |

Primary Examiner—Edward G. Favors
Attorney—Richards & Geier

[57] ABSTRACT

A synchronous universal joint is used for inelastic, homokinetic transmission of torsional moments between angularly intersecting shafts. The coupling halves of these shafts are connected by transmission elements consisting of two hinge-like disk halves. Each of these disk halves is pivotally mounted on a pin, the pins being located at the same distance from the center. The disk halves are swingably connected by a shaft extending vertically to the pins. The invention is particularly characterized in that the disk halves have oblong holes so that they can slide on the pins. A centering device is used to aline the coupling halves in said center and to fix the disk halves in a central position so that the swiveling axis of the shaft always extends through said center which is the point of intersection of the center lines of the coupling halves.

3 Claims, 5 Drawing Figures

Inventor
H. Pickel
By
Richards & Geier
ATTORNEYS

SYNCHRONOUS UNIVERSAL JOINT

This invention relates to a synchronous universal joint for inelastic and homokinetic transmission of torsional moments between two shafts which angularly intersect.

Cardan joints, knuckle joints or spherical joints are used for the transmission of torsional moments between angularly intersecting shafts, but their common drawback is that the motion of the driven shaft is not uniform with that of the driving shaft, whereby additional accelerations and decelerations arise, causing unquiet run, vibrations and higher wear of machine parts.

On the other hand, synchronous universal joints guarantee a uniform transmission of motion. The known synchronous universal joints generally use for power transmission sets of balls, loaded either for shearing or for pressure. Precondition for unobjectionable function of these joints is safety against squeezing and an exact, specialized manufacture.

An object of the present invention is to provide an improved synchronous universal joint which is simple in construction, inexpensive to manufacture and reliable in operation.

Another object is the provision of a joint of this type which can have comparatively small dimensions.

Other objects of the present invention will become apparent in the course of the following specification.

In the accomplishment of the objectives of the present invention it was found desirable to provide for the transmission of torsional moments from one coupling half to the other one an axially extending disk, the hinge-like halves of which are swivelling about the center of the joint and are pivoted in a transverse direction at the two coupling halves about points equidistant from the center of the joint.

The uniform transmission of motion is carried out by means of an internal or external centering device which holds the swivel axis of the hinge-like disk halves in the plane of the angle bisector between the center lines of the coupling halves.

The joint is externally centered, like a double knuckle joint, by two rigidly journalled shafts which must be adjusted in such a manner that the swivel axis of the disk halves is in the plane of the angle bisector between the center lines of the coupling halves.

The internal centering of the joint automatically provides the spatial fulcrum point for the coupling halves through which point also the swivel axis of the disk halves extends. The internal centering device is, for example, a ball moving in recesses of the coupling halves and sliding along the shaft about which the disk halves swivel.

The invention will appear more clearly from the following detailed description when taken in connection with the accompanying drawings showing by way of example only, preferred embodiments of the inventive idea.

The drawings show coupling halves 1 and 2 which are equal to each other. The torsional moment is transmitted by the disk halves 3a, 3b which can swivel relatively to each other about a shaft 4 which has a tight fit in one disk half and a running fit in the other disk half. The disk halves 3a and 3b are pivoted in central slots on pins 5 fixed to the coupling halves and equidistant from the shaft 4.

This construction provides three possibilities of motion in two planes extending vertically to each other.

Figure 1:
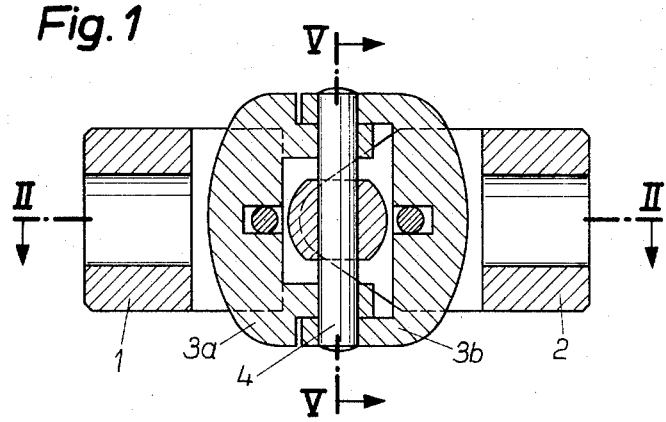
FIG. 1 shows in section a universal joint of the present invention, the section being along the lines I — I of FIG. 2.
Figure 2:
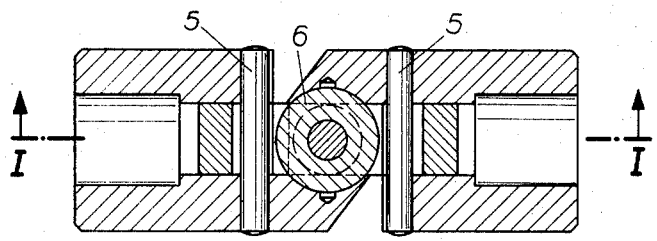
FIG. 2 is a section along the line II — II of FIG. 1.
Figure 3:
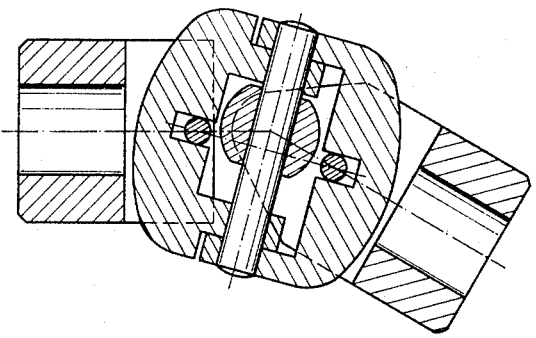
FIG. 3 is similar to FIG. 1 but shows the joint in a deflected position.

One centering construction shown in FIGS. 1–3 consists of a ball 6 slidably mounted upon the shaft 4. The ball 6 is rotatably held in recesses provided at the ends of the coupling halves 1 and 2. The coupling halves are laterally held by disk halves 3a and 3b.

Figure 4:
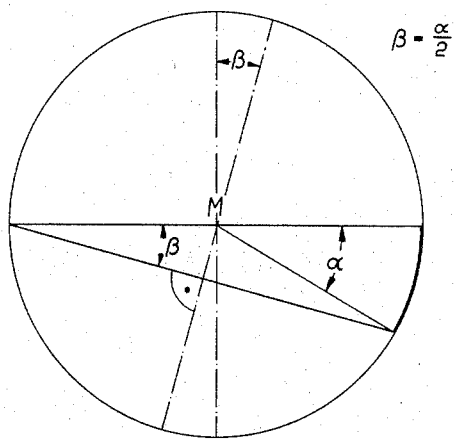
FIG. 4 is a diagram illustrating angular bisections.

The angular bisection is shown in FIG. 3 and indicated by the diagram of FIG. 4. Coupling halves 1 and 2 move concentrically relatively to the ball 6. The central pivot M (FIG. 4) is the point of intersection of the central lines of the coupling halves 1 and 2. Since the pins 5 are equidistant from the ball 6, they move along a circle wherein the angle of deflection $\alpha$ is an angle at the center and the angle $\beta$ of deviation of the disk halves is a secant angle. According to the rules of geometry angle $\beta$ equals one half of the angle $\alpha$.

Moreover FIGS. 3 and 4 show that the distance between the pins 5 decreases if the joint is deflected. Therefor the holes in the disk halves 3a, 3b for the pins 5 are short slots. Thus according to this embodiment, the position of the disk halves 3a, 3b is also fixed by the centering.

Figure 5:
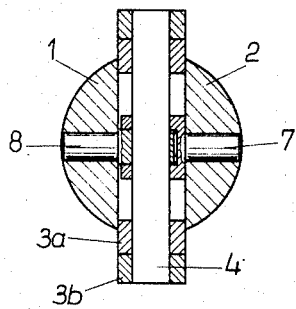
FIG. 5 is a transverse section through the joint but illustrates a different centering.

FIG. 5 illustrates as a second embodiment an internal centering. Eyebolts 7, 8 are journalled in the coupling halves 1 and 2 and axially secured by snap rings. They are swingable about the shaft 4, the latter being slidable in the bores of the eyebolts 7, 8.

The advantages of a universal joint according to the present invention are that it can be produced by simple production means and that it meets with all requirements regarding absolutely uniform motion, high angle of deflection, and centering.

I claim:

1. A synchronous universal joint, comprising in combination, two opposed coupling halves, each of said coupling halves having a transverse slot, said slots extending parallel to each other, two hinge-like disk halves, said coupling halves having recesses, said disk halves fitting into said recesses and having slots alined with the slots of said coupling halves, two parallel pins, each of said pins extending through a separate slot of a coupling half and a corresponding slot of a disk half, whereby forces may be transmitted from said coupling halves to said disk halves through flat parallel surfaces, a shaft extending perpendicularly to said pins, said pins being equally spaced from said shaft, said disk halves having portions swingably mounted upon said shaft, the axis of rotation of said shaft extending through the point of intersection of the central lines of the coupling halves, rotary movements about said pins being one-half of the corresponding rotary movements about said shaft, and a centering device aligning said coupling halves and fixing said disk halves in a central position, said centering device having a center substantially coinciding with said point of intersection.

2. A joint in accordance with claim 1, wherein said centering device consists of a ball having a bore, said shaft extending slidably through said bore, said coupling halves having recesses for said ball.

3. A joint in accordance with claim 1, wherein said centering device consists of two eyebolts journalled in separate coupling halves, each of said eyebolts being swingable about and slidable along said shaft.

* * * * *